US010454295B2

United States Patent
Kumar et al.

(10) Patent No.: US 10,454,295 B2
(45) Date of Patent: Oct. 22, 2019

(54) DUAL-ORIENTATION STAND

(71) Applicant: Microsoft Technology Licensing, LLC, Redmond, WA (US)

(72) Inventors: Navin Kumar, Seattle, WA (US); Christopher Kujawski, Seattle, WA (US); Carl J. Ledbetter, Mercer Island, WA (US); Sam Michael Sarmast, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 311 days.

(21) Appl. No.: 15/262,915

(22) Filed: Sep. 12, 2016

(65) Prior Publication Data

US 2018/0076648 A1   Mar. 15, 2018

(51) Int. Cl.
| | |
|---|---|
| *A63F 9/00* | (2006.01) |
| *H02J 7/02* | (2016.01) |
| *A63F 13/98* | (2014.01) |
| *H02J 7/00* | (2006.01) |
| *H02J 50/10* | (2016.01) |
| *H02J 50/90* | (2016.01) |

(52) U.S. Cl.
CPC .............. *H02J 7/025* (2013.01); *A63F 13/98* (2014.09); *H02J 7/0044* (2013.01); *H02J 50/10* (2016.02); *H02J 50/90* (2016.02)

(58) Field of Classification Search
CPC ............ A63F 13/98; A63F 13/02; H02J 7/025
USPC ................ 248/176.1; 273/148 B, 148 R, 309
See application file for complete search history.

(56) References Cited

U.S. PATENT DOCUMENTS

| | | |
|---|---|---|
| 4,422,640 A | 12/1983 | Tamarkin |
| 4,494,755 A | 1/1985 | Caillouet |
| 5,209,478 A | 5/1993 | Simpson |
| 6,568,334 B1 | 5/2003 | Gaudette et al. |
| 6,663,058 B1 | 12/2003 | Peterson et al. |
| 6,773,349 B2 | 8/2004 | Hussaini et al. |
| 6,789,771 B1 | 9/2004 | Shick et al. |

(Continued)

OTHER PUBLICATIONS

Grubb, Jeff, "Hands-on with Microsoft's new Xbox One controller: Bluetooth, better grip, and improved thumbsticks", Published on: Jun. 14, 2016 Available at: http://venturebeat.com/2016/06/14/new-xbox-one-controller-hands-on-bluetooth-better-grip-and-more/.

(Continued)

*Primary Examiner* — Todd M Epps
(74) *Attorney, Agent, or Firm* — Alleman Hall Creasman & Tuttle LLP

(57) ABSTRACT

A dual-orientation stand for supporting a user input device in two device orientations is provided. The stand may comprise a first planar surface configured to rest on a support surface in a first stand orientation, and a second planar surface extending from the first planar surface at an obtuse angle. A third planar surface is spaced from the second planar surface and extends from the first planar surface. A concave portion between the second and third surfaces is configured to hold the device in a first device orientation when the stand is in the first stand orientation. The second planar surface is configured to support the device in a second device orientation when the stand is in a second stand orientation in which the third planar surface rests on the support surface.

20 Claims, 12 Drawing Sheets

(56) References Cited

U.S. PATENT DOCUMENTS

| | | | |
|---|---|---|---|
| 7,156,026 B2 | | 1/2007 | McClellion |
| 7,942,747 B2 * | | 5/2011 | Cole |
| D657,741 S * | | 4/2012 | Fahrendorff ................ D13/108 |
| D668,662 S * | | 10/2012 | Suiter ........................ D14/447 |
| D672,350 S * | | 12/2012 | Gioscia ...................... D14/434 |
| D741,336 S * | | 10/2015 | Miniard ...................... D14/447 |
| 9,421,472 B2 * | | 8/2016 | Buller ..................... A63F 13/24 |
| 2008/0230987 A1 * | | 9/2008 | Jackson ................. A63F 13/98 |
| | | | 273/148 B |
| 2009/0020665 A1 | | 1/2009 | Minke |
| 2009/0325717 A1 | | 12/2009 | Lee-Him |
| 2015/0190720 A1 | | 7/2015 | Buller |

OTHER PUBLICATIONS

"Insignia™—Dual-Controller Charger for Xbox One" Release Date: Nov. 15, 2013 Available at: http://www.bestbuy.com/site/insignia-dual-controller-charger-for-xbox-one/2352071.p?id=1219073326634.

"Power A—Dual Controller Charging Station for Xbox One—Black" Release Date: Jan. 14, 2016 Available at: http://www.bestbuy.com/site/power-a-dual-controller-charging-station-for-xbox-one-black/8685203.p?id=1219359703536&skuId=8685203.

* cited by examiner

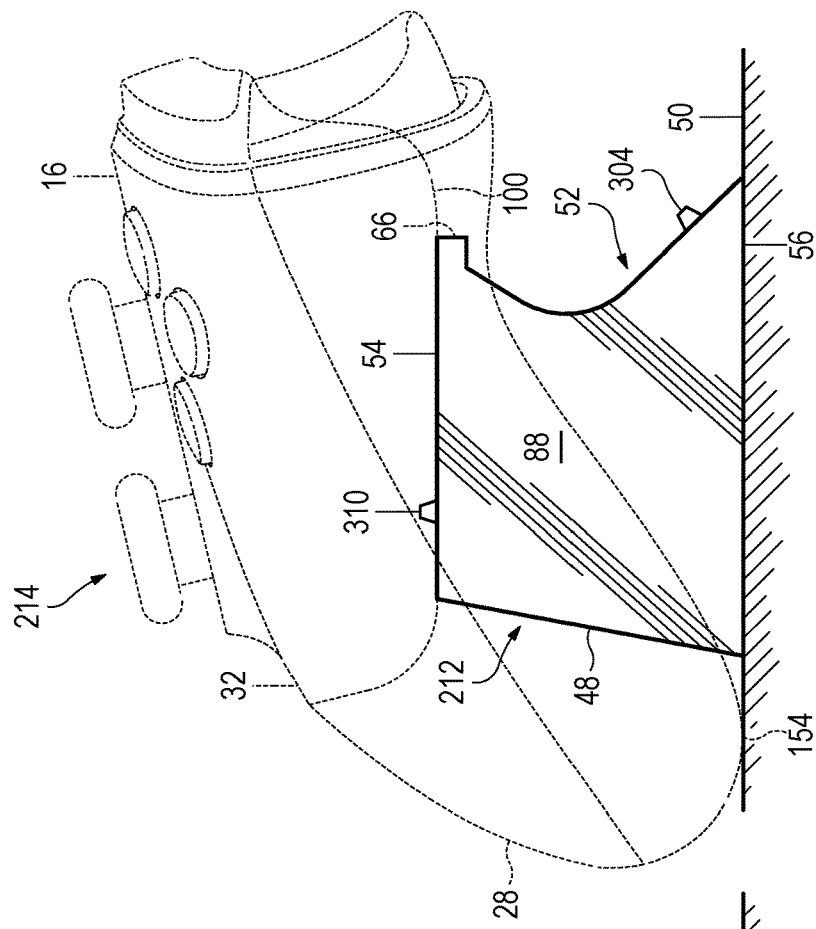
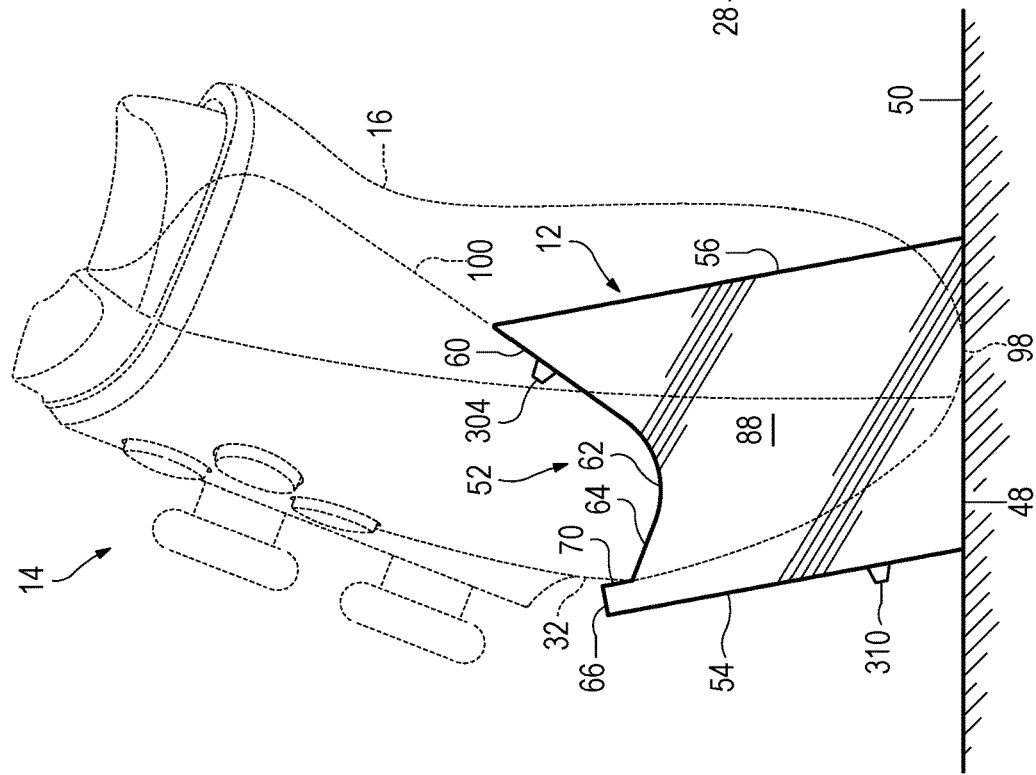

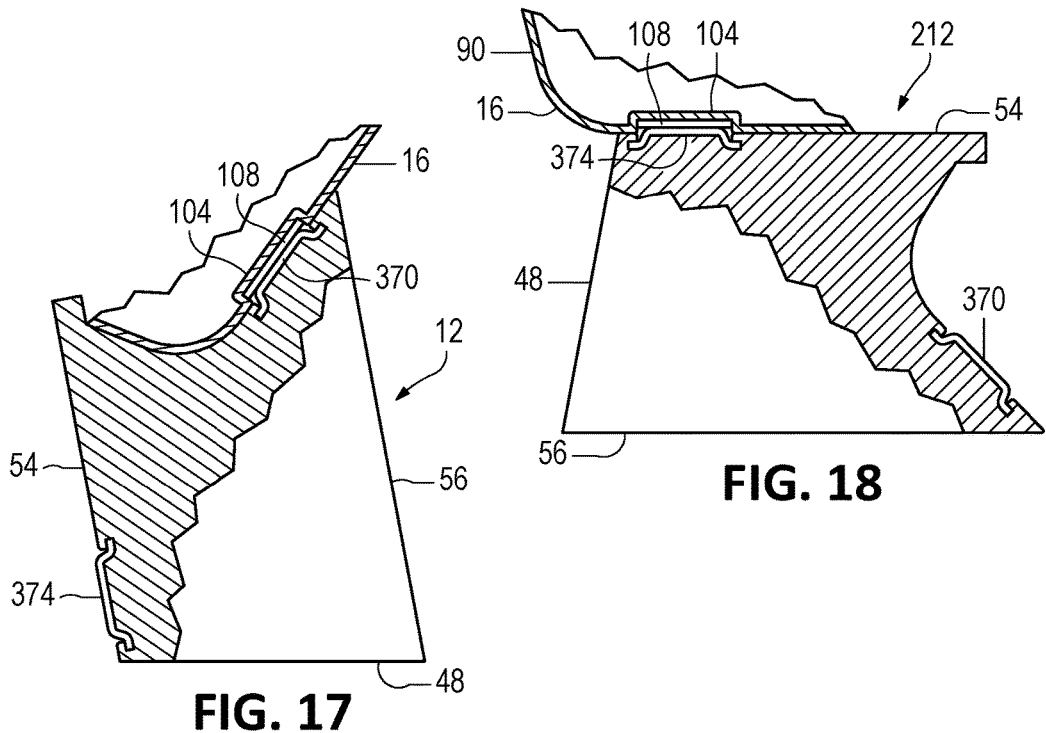
FIG. 17
FIG. 18
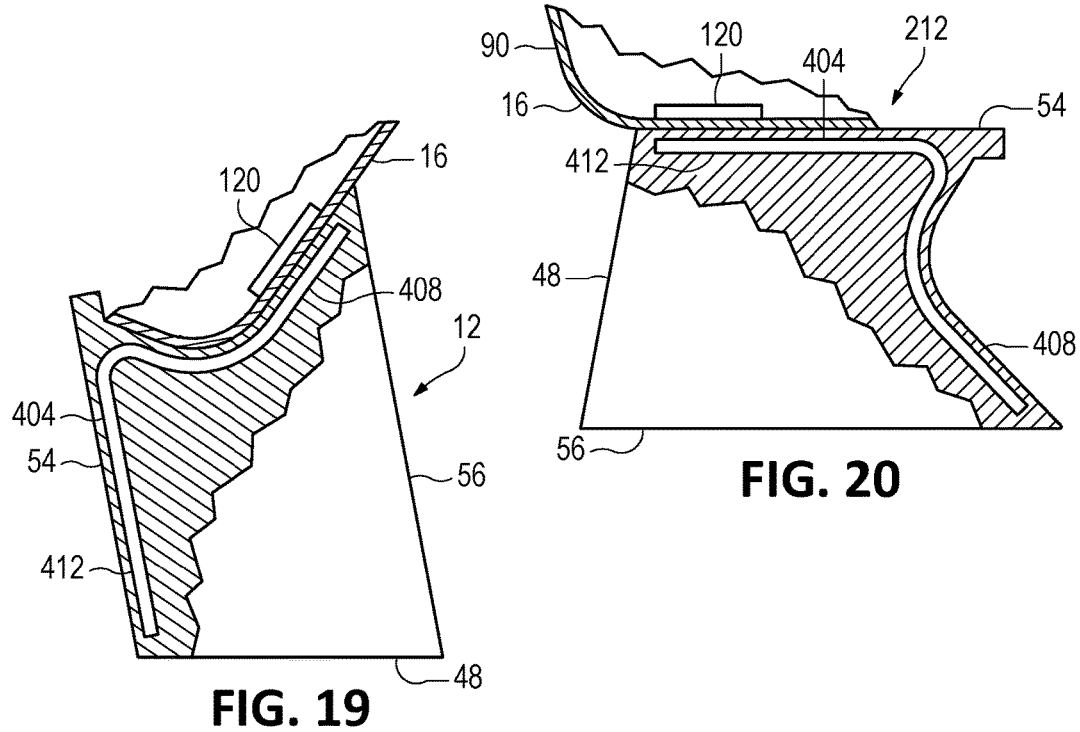
FIG. 19
FIG. 20

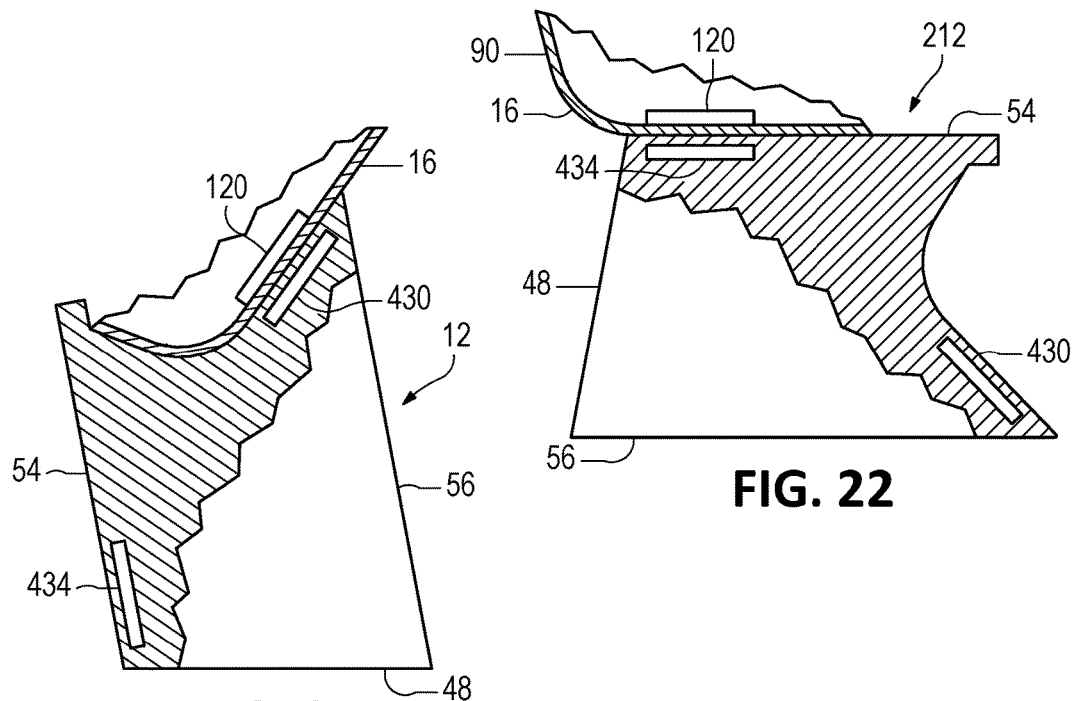
FIG. 21
FIG. 22
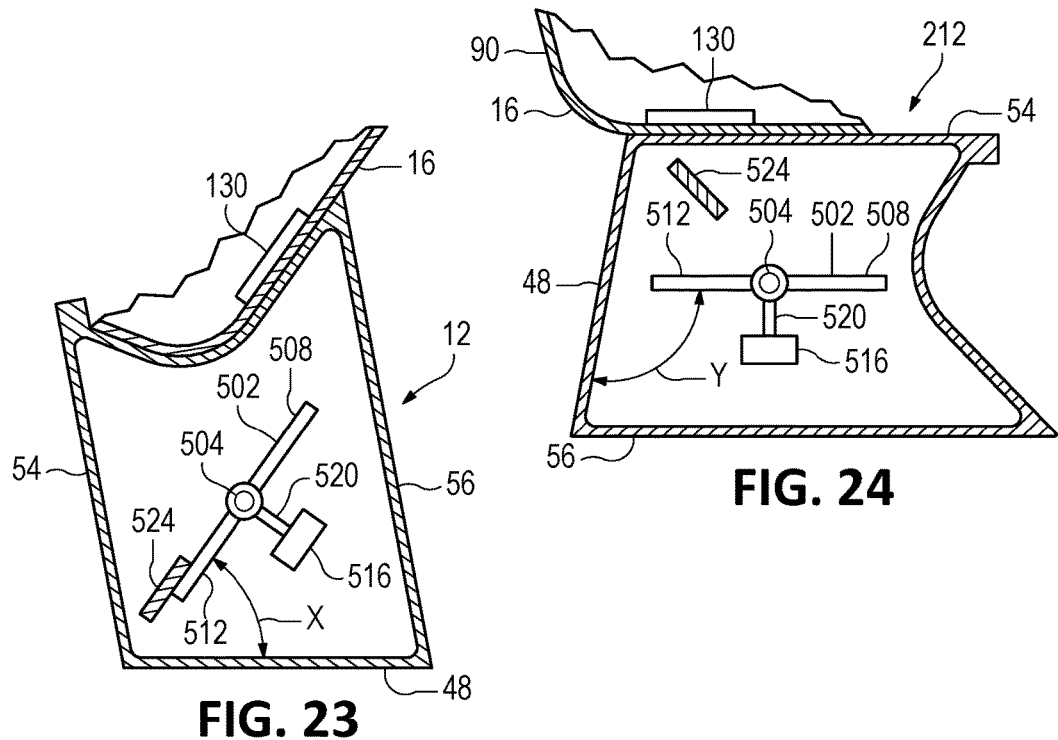
FIG. 23
FIG. 24

DUAL-ORIENTATION STAND

BACKGROUND

When not in use, handheld device controllers may be stored or put on display. A stand may hold a handheld device in one position. Some stands may have portions that obscure features of the device.

SUMMARY

A dual-orientation stand for a user input device may comprise a first planar surface configured to rest on a support surface in a first stand orientation. A second planar surface extends from the first planar surface at an obtuse angle to the first planar surface. A third planar surface is spaced from the second planar surface and extends from the first planar surface. A concave portion between the second planar surface and the third planar surface is configured to hold the user input device in a first device orientation when the dual-orientation stand is in the first stand orientation. When the stand is in a second stand orientation in which the third planar surface rests on the support surface, the second planar surface is configured to support the user input device in a second device orientation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a side view of the dual-orientation stand of FIG. 1.

FIG. 6 shows a side view of the dual-orientation stand of FIG. 2.

FIG. 17 shows a partial cross-section view of a dual-orientation stand with two stand charging components according to examples of the present disclosure.

FIG. 18 shows a partial cross-section view of the dual-orientation stand of FIG. 17 in a second stand orientation.

FIG. 19 shows a partial cross-section view of a dual-orientation stand with an inductive charging component according to examples of the present disclosure.

FIG. 20 shows a partial cross-section view of the dual-orientation stand of FIG. 19 in a second stand orientation.

FIG. 21 shows a partial cross-section view of a dual-orientation stand with two inductive charging components according to examples of the present disclosure.

FIG. 22 shows a partial cross-section view of the dual-orientation stand of FIG. 21 in a second stand orientation.

FIG. 23 shows a partial cross-section view of a dual-orientation stand with a pivoting inductive charging component according to examples of the present disclosure.

FIG. 24 shows a partial cross-section view of the dual-orientation stand of FIG. 23 in a second stand orientation.

DETAILED DESCRIPTION

Figure 1:
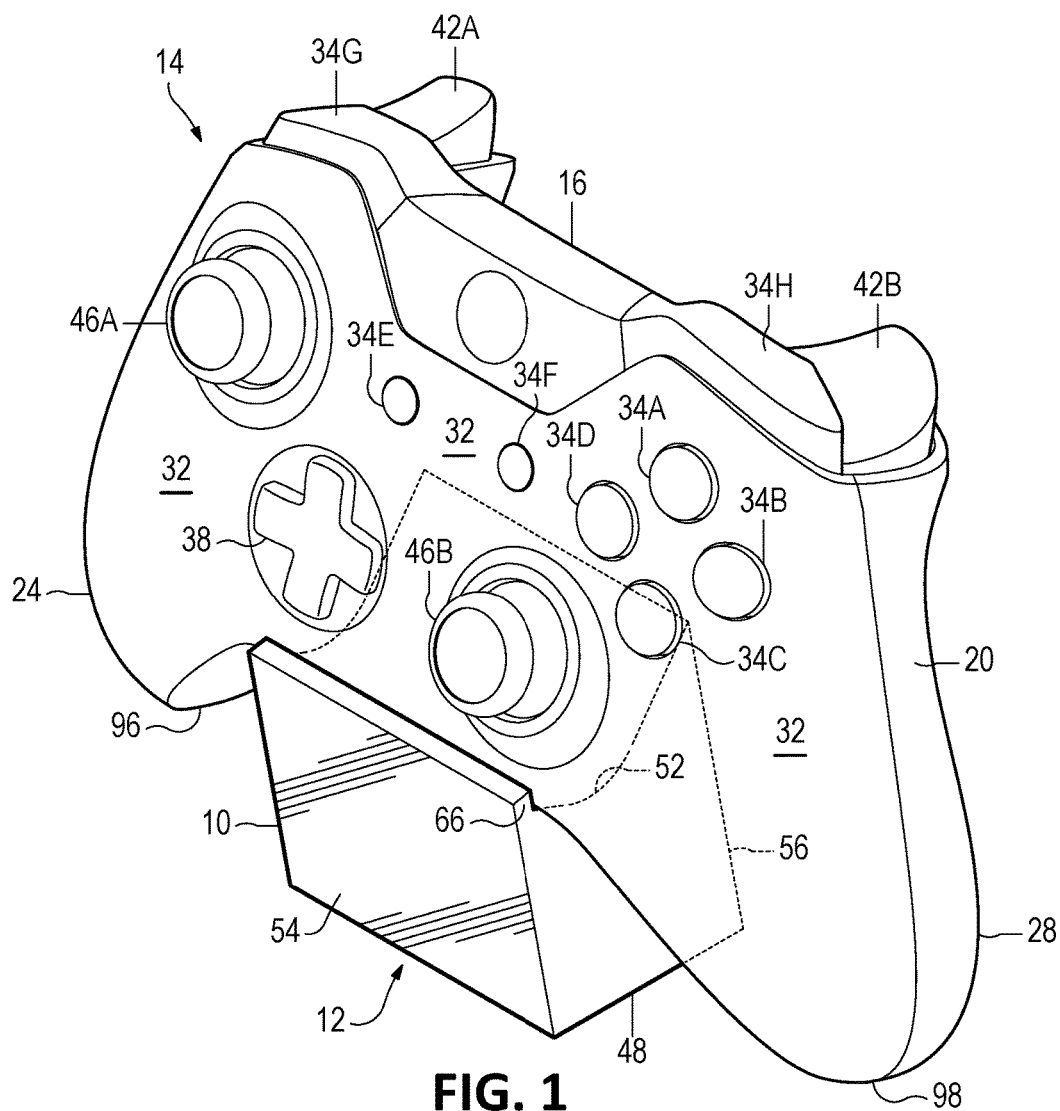
FIG. 1 shows a perspective view of a dual-orientation stand in a first stand orientation with a game controller mounted in a first device orientation according to examples of the present disclosure.

User input devices may be designed to facilitate user interaction with a video game or other application executing on a computer, video game console, or other platform. For example, a handheld game controller may provide a means by which a user can control a character or object within a video game. Other examples of handheld user input devices may be used to remotely control a vehicle or other machine, such as an unmanned aircraft (e.g., a drone), a land-based vehicle, or other machine.

In some examples, a user input device may include one or more user-actuatable control elements with which a user may provide input. Each of these control elements may be manipulated by a user to generate various control signals for interacting with another machine or device. For example, a user input device may be designed to be held in two hands and may include one or more user-actuatable thumbsticks, buttons, triggers, directional pads, touch pads, etc.

When not in use, a handheld user input device may be placed on a table, desk or other surface, or stored in a drawer or other container. For some occasions, such as trade shows, product displays, internal presentations, etc., a user input device may be displayed for viewing and/or physical inspection. A stand may hold a handheld device in a single position. In some stands, portions of the stand may obscure features of the device.

Accordingly, the present disclosure is directed to a dual-orientation stand for a user input device that may support the device in two different device orientations in visually pleasing manners. In some examples and with reference to FIG. 1, a dual-orientation stand 10 may be positioned in a first stand orientation 12 to display a user input device in a first device orientation 14. With reference to FIG. 2, the dual-orientation stand 10 also may be positioned in a second stand orientation 212 to display a user input device in a second device orientation 214. As described in more detail below, in some examples the dual-orientation stand may be configured with particular geometries and spatial relationships between and among different surfaces of the stand that position the user input device in the two different device orientations. Additionally, the geometries and spatial relationships between and among different surfaces of the stand may be configured to coordinate with the shape and configuration of a user input device to display the device in the two different device orientations.

Figure 2:
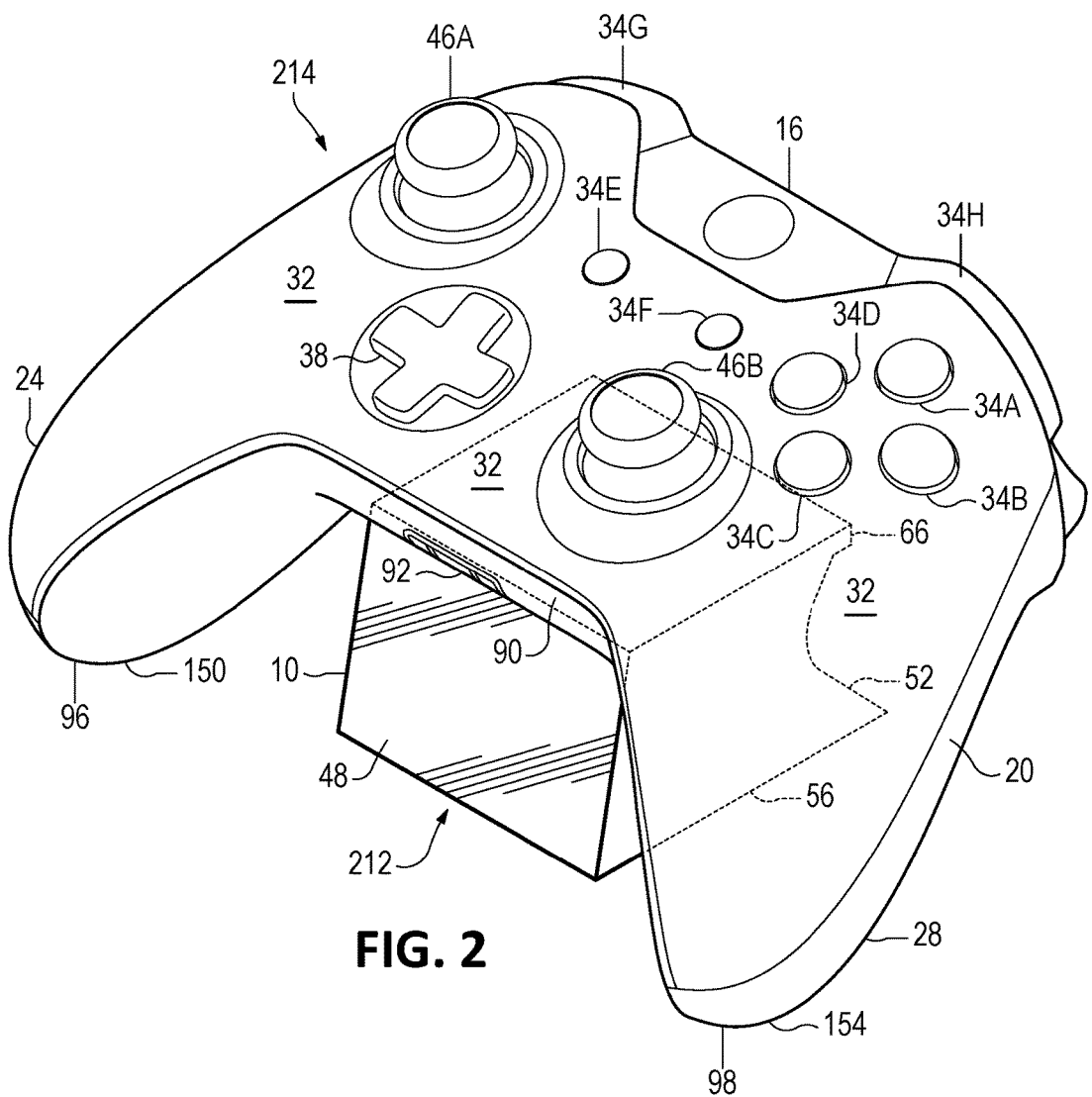
FIG. 2 shows a perspective view of the dual-orientation stand of FIG. 1 in a second stand orientation with the game controller supported in a second device orientation according to examples of the present disclosure.
Figure 4:
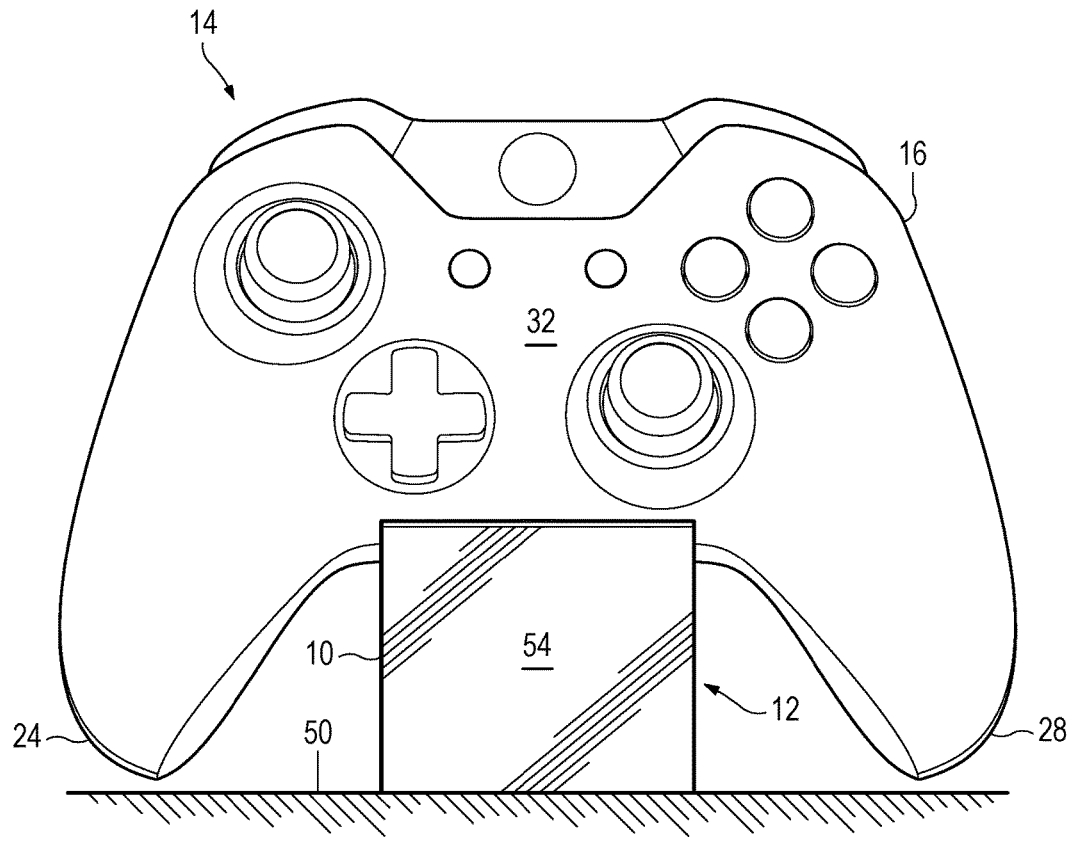
FIG. 4 shows a front perspective view of the dual-orientation stand and game controller of FIG. 1.

In some examples and with reference to FIGS. 1, 4 and 5, the stand 10 may be placed in a first stand orientation 12 that supports a user input device in a first device orientation 14. In these examples, the user input device is shown in the form of a game controller 16. The game controller 16 includes a housing 20 that is configured to be held by a user with two hands. As such, the housing 20 includes a left handle 24 configured to be gripped by a left hand and a right handle 28 configured to be gripped by a right hand. When a user holds the controller 16 with two hands such that the left hand grips the left handle 24 and the right hand grips the right handle 28, the user's thumbs may naturally interface with a user-facing surface 32 of the housing 20.

The game controller 16 may be configured to translate user input into control signals that are provided to a computing device, such as a gaming console. For example, the game controller 16 may be configured to send control signals via a wired or wireless connection to a computing device. The control signals may be mapped to commands to control a video game or other program or application.

The game controller 16 includes a plurality of controls configured to generate different control signals responsive to thumb and/or finger manipulation. In this example, controls located on the user-facing surface 32 of the game controller 16 include a plurality of action buttons 34 (e.g., 34A, 34B, 34C, 34D, 34E, and 34F), a directional pad 38, a left thumbstick 46A and a right thumbstick 46B. In this example the game controller 16 also includes action buttons 34G and 34H, a left trigger 42A and a right trigger 42B. In other examples a game controller or other user input device may include any suitable number and type of controls.

In some examples, game controller 16 may be an Xbox One® game controller manufactured by Microsoft Corporation. Game controller 16 is provided as an example of a user input device for purposes of illustration, and is not intended to be limiting. Other types of user input devices to which the present disclosure may apply (such as other game controllers, air and land vehicle controllers, etc.) may have different shapes, different sizes, different numbers and/or placements of user interface features (thumbsticks, buttons, knobs, switches, triggers, pads, etc.), and/or other differences from game controller 16 shown in the present examples.

As described in more detail below, in the first stand orientation 12 the stand 10 presents the game controller 16 in the first device orientation 14. With reference to FIGS. 1, 4, 5, and 7, to display the game controller 16 in the first device orientation 14, a user places a first planar surface 48 of the dual-orientation stand 10 on a support surface 50 to orient the stand in the first stand orientation 12. In some examples, the support surface 50 may be a flat surface such as a tabletop, countertop, or other similar surface. The user then seats the game controller 16 in a concave portion 52 of the stand 10 between a second planar surface 54 and a third planar surface 56 of the stand.

Figure 7:
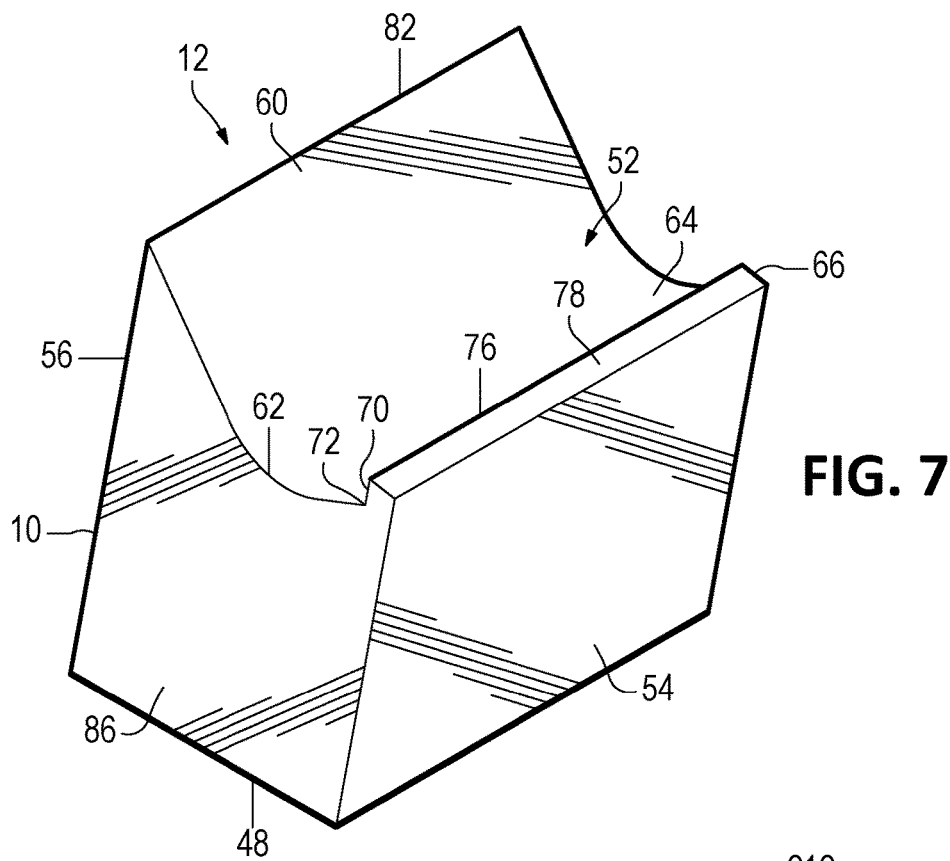
FIG. 7 shows a perspective view of the dual-orientation stand according to examples of the present disclosure.
Figure 9:
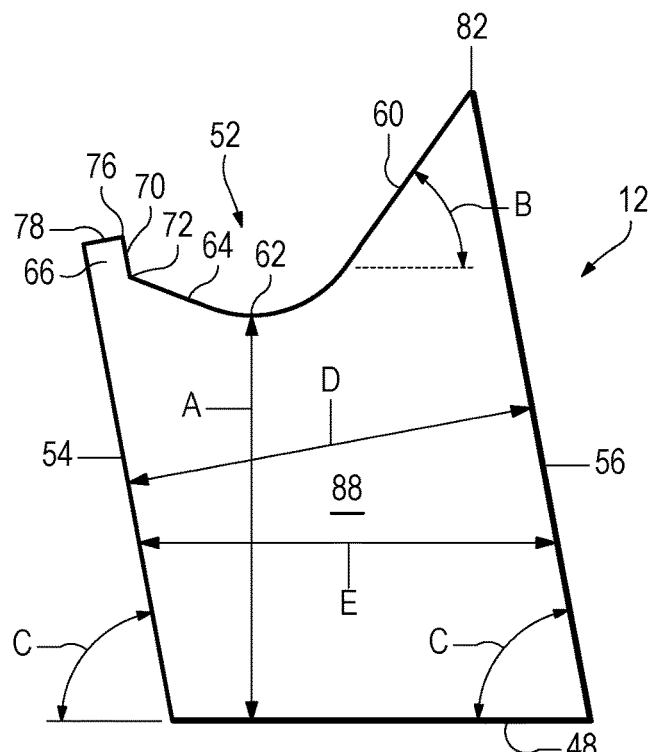
FIG. 9 shows a side view of the dual-orientation stand of FIG. 7.

With reference now to the examples of FIGS. 7 and 9, the concave portion 52 includes a rear portion 60, a bottommost surface 62, and a front portion 64. A lip 66 extends from the front portion 64 of the concave portion 52. In this example, the lip 66 comprises a flat strip 70 facing inwardly toward the concave portion 52 and extending laterally across a width of the stand. The flat strip 70 extends between a front edge 72 of the concave portion 52 and a rear edge 76 of a flat top surface 78 that also extends laterally across the width of the stand.

Figure 10:
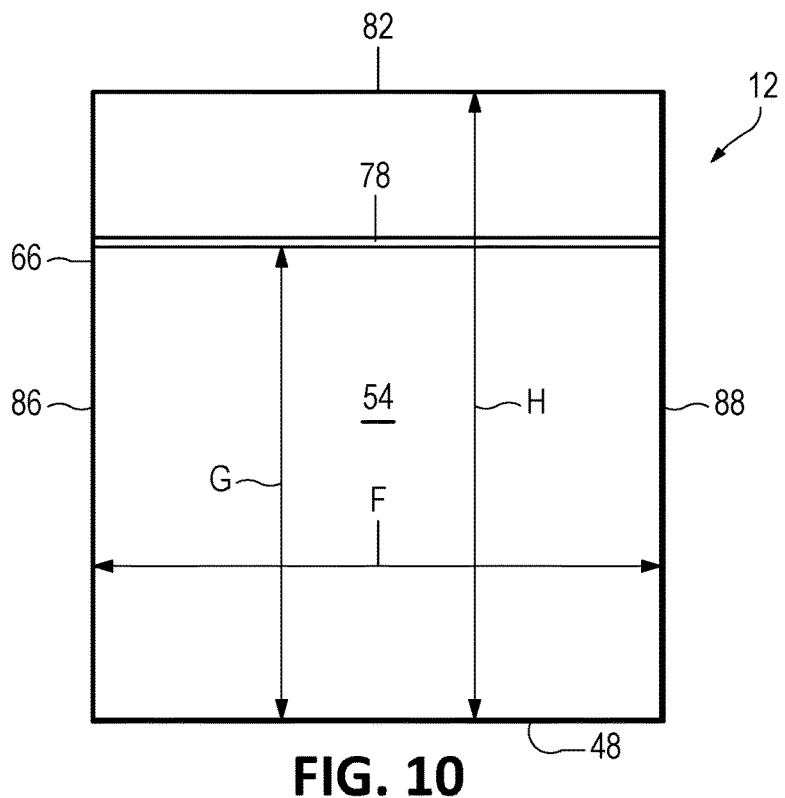
FIG. 10 shows a front view of the dual-orientation stand of FIG. 7.

With reference to the example of FIGS. 9 and 10, the geometries and spatial relationships among different surfaces of the dual-orientation stand 10 may be configured to coordinate with the game controller 16 to present the controller in two device orientations. In the example dual-orientation stand 10 of FIGS. 9 and 10 showing the stand in the first stand orientation 12, a distance A from the first planar surface 48 to the bottommost surface 62 of the concave portion 52 along a line perpendicular to the first planar surface is approximately 36.6 mm. The rear portion 60 of concave portion 52 forms an angle B with the first planar surface 48 (and with the horizontal in this first stand orientation 12) of approximately 53.8 degrees.

The third planar surface 56 forms an angle C with the first planar surface 48 (and with the horizontal in this first stand orientation 12) of approximately 79.4 degrees. Similarly, the second planar surface 54 forms the same angle C with the horizontal of approximately 79.4 degrees. Correspondingly, the second planar surface 54 forms an obtuse angle of approximately 100.6 degrees with the first planar surface 48. Accordingly, in this example the second planar surface 54 and the third planar surface 56 are parallel.

A distance D from the second planar surface 54 to the third planar surface 56 along a line perpendicular to both of these surfaces is approximately 35.5 mm. A distance E from the second planar surface 54 to the third planar surface 56 along a line that is parallel to the first planar surface 48 (and parallel to the horizontal in this first stand orientation 12) is approximately 36.1 mm. With reference now to the front view of the dual-position stand 10 shown in FIG. 10, the stand may have a width F of approximately 50.9 mm. The lip 66 may have a height G above the first planar surface 48 along a line perpendicular to this surface of approximately 42.6 mm. The peak 82 of the upper portion 60 of the concave portion 52 may have a height H above the first planar surface 48 along a line perpendicular to this surface of approximately 53.0 mm.

Other examples of a dual-orientation stand according to the present disclosure may have one or more of the above-described distances and/or angles between surfaces modified, provided the stand still holds the game controller 16 in the first device orientation when the stand is in the first stand orientation, and supports the controller in the second device orientation when the stand is in the second stand orientation as described herein.

Figure 8:
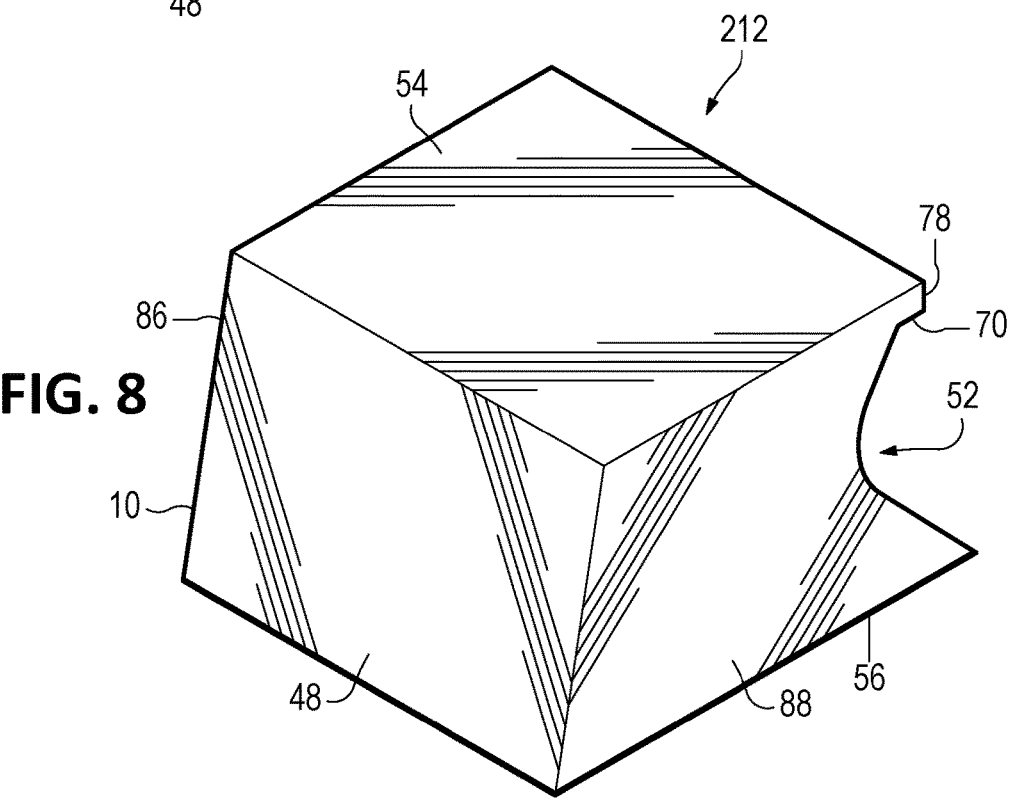
FIG. 8 shows another perspective view of the dual-orientation stand of FIG. 7.

With reference to FIGS. 7 and 8, the dual-orientation stand further comprises a left side planar surface 86 extending between the second planar surface 54 and the third planar surface 56, and a right side planar surface 88 opposite to the left side planar surface 86 and extending between the second planar surface 54 and the third planar surface 56. In some examples the left side planar surface 86 and the right side planar surface 88 are parallel.

With reference now to FIGS. 1, 4 and 5, in the first stand orientation 12 the dual-orientation stand 10 presents the game controller 16 in the first device orientation 14 in which the controller is proudly held in a forward-facing position that prominently displays the user-facing surface 32 and the controls located on this surface. More particularly, the concave portion 52 of the stand 10 positions the user-facing surface 32 in a substantially upright posture relative to the support surface 50 when the stand is in the first stand orientation holding the user input device in the first device orientation.

Further, the configuration and compact footprint of the dual-orientation stand 10 puts the game controller 16 in this heroic stance while overlapping with just a small bottom strip of the user-facing surface 32 when viewed from the front (see, for example, FIG. 4). In this first stand orientation 12 and with reference to FIGS. 1 and 5, the concave portion 52 also cooperates with the forward-leaning second planar surface 54 and third planar surface 56 to prominently display the game controller 16 while also locating significant portions of the stand out of sight underneath the controller. In some examples this configuration also may locate the center of gravity of the game controller 16 substantially over the middle of the stand, thereby providing a stable support for the controller.

With this configuration and in the first stand orientation 12, the dual-orientation stand 10 prominently displays the game controller 16 while also remaining visually unobtrusive to the user-facing surface 32 and other portions of the controller. In this manner, a viewer's attention may be drawn to the controller without undue distraction from the stand 10. A viewer may thereby fully appreciate the design and configuration of the game controller 16. For example, special editions of the game controller 16 that feature custom colors, graphics and/or other ornamental aspects of the user-facing surface 32 and/or other portions of the controller may be presented to a viewer in a visually appealing manner.

Additionally, in the illustrated examples the dual-orientation stand 10 has a single-piece construction. In some examples, the stand 10 may be machined or otherwise formed from a single block of acrylic or other transparent material. Utilizing such a transparent material may further enhance the display and presentation of the game controller 16 as described above.

Figure 3:
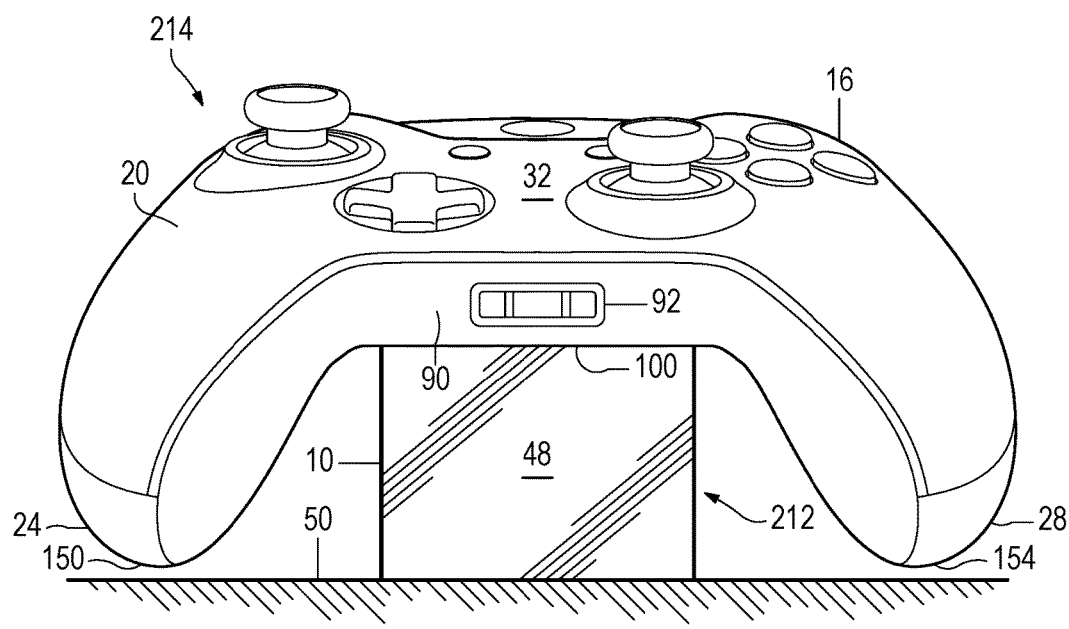
FIG. 3 shows a front perspective view of the dual-orientation stand and game controller of FIG. 2.

With reference now to FIG. 3, the game controller 16 includes a central bottom portion 90 between the left handle 24 and the right handle 28. A port 92 may be located at the central bottom portion 90, and may house one or more data, video and/or electrical connectors. As can be seen in FIGS. 1, 4 and 5, in the first device orientation 14 the central bottom portion 90 of the game controller 16 is held in the concave portion 52 of the stand 10. As illustrated in FIGS. 1, 4 and 5, a small bottom strip of the user-facing surface 32 of the controller 16 abuts the flat strip 70 of the lip 66.

In some examples and with reference to FIGS. 1 and 5, in the first stand orientation 12 the bottommost surface 62 of the concave portion 52 of the stand is spaced from the first planar surface 48 of the stand by a first supporting distance (corresponding to distance A in FIG. 9) that causes a left distal end 96 of the left handle 24 and a right distal end 98 of the right handle 28 of the game controller 16 to contact the support surface 50 when the controller is held in the concave portion. In this manner, a tripod support configuration is provided in which three points/areas of contact between the game controller 16 and the support surface 50 provide a stable support for the controller.

In other examples and with reference to FIGS. 4 and 9, the first supporting distance may be slightly larger such that in the first stand orientation 12, the bottommost surface 62 of the concave portion 52 of the stand 10 is spaced from the first planar surface 48 of the stand by a first supporting distance (A) that causes the left distal end 96 of the left handle 24 and the right distal end 98 of the right handle 28 of the game controller 16 to be spaced from the support surface 50 by a distance of approximately 1.0 mm or less when the controller is held in the concave portion. In this manner, the game controller 16 is displayed in a slightly elevated position above the support surface 50 to create a different visual impression. This configuration also provides a measure of lateral stability by spacing the ends of both handles from the support surface 50 by a distance of approximately 1.0 mm or less, thereby ensuring that a slight lateral tilt of the game controller 16 may be quickly counteracted by contact of a handle end with the support surface.

As described above, the dual-orientation stand 10 may display the game controller 16 in two different device orientations. Accordingly and with reference to FIGS. 2, 3, and 6, the dual-orientation stand 10 also may be placed in a second stand orientation 212 that displays the game controller 16 in a second device orientation 214. To display the game controller 16 in the second device orientation 214, a user positions the third planar surface 56 of the stand 10 on the support surface 50. The user then places at least a portion of a rear surface 100 (see also FIG. 5) of the game controller 16 on the second planar surface 54 of the stand 10, wherein the second planar surface is configured to support the user input device in the second device orientation 214.

In the second stand orientation 212 the dual-orientation stand 10 presents the game controller 16 in the second device orientation 214 in which the controller is supported by the second planar surface 54 of the stand 10 in a manner that positions the user-facing surface 32 in a substantially recumbent posture relative to the support surface 50. This positioning of the game controller 16 invites a user to pick up the controller. Further and in some examples, when a user stands over a game controller 16 that is supported by the stand 10 in the second device orientation 214, or the user's head is otherwise above the controller in the second device orientation, the stand may not be visible to the user. Accordingly, in these examples the user may be presented with a visually appealing view of the game controller 16 that appears to be floating just above the support surface.

In some examples and as illustrated in FIGS. 2, 3, and 6, a user may place at least a portion of the rear surface 100 of the game controller 16 on the second planar surface 54 of the stand 10 by orienting the stand and the controller such that the central bottom portion 90 of the controller is closer to the first planar surface 48 of the stand than to the concave portion 52 of the stand. In this manner and with reference to FIG. 6, the first planar surface 48 is tilted underneath the game controller 16 to minimize any visual distraction from the controller. In other examples, a user may orient the stand 10 and the game controller 16 such that the central bottom portion 90 of the controller is closer to the concave portion 52 of the stand than to the first planar surface 48 of the stand.

In some examples and with reference to FIGS. 2 and 6, in the second stand orientation 212 the second planar surface 54 of the stand 10 is spaced from the third planar surface 56 by a second supporting distance (corresponding to distance D in FIG. 9) that causes a left anterior distal end 150 of the left handle 24 and a right anterior distal end 154 of the right handle 28 to contact the support surface 50 when the controller 16 is supported by the second planar surface 54. In this manner, a tripod support configuration is provided in which three points/areas of contact between the game controller 16 and the support surface 50 provide a stable support for the controller.

In other examples, the second supporting distance between the second planar surface 54 and the third planar surface 56 may be slightly larger. In these examples and with reference to FIG. 3, in the second stand orientation 212 the second planar surface 54 of the stand 10 is spaced from the third planar surface 56 by a second supporting distance that causes the left anterior distal end 150 of the left handle 24 and the right anterior distal end 154 of the right handle 28 to be spaced from the support surface 50 by a distance of approximately 1.0 mm or less when the controller is supported by the second planar surface 54. In this manner, the game controller 16 is displayed in a slightly elevated position above the support surface 50 to create a different visual impression. This configuration also provides a measure of lateral stability by spacing the anterior distal ends of both handles from the support surface 50 by a distance of approximately 1.0 mm or less, thereby ensuring that a slight lateral tilt of the game controller 16 will be quickly counteracted by contact of an anterior distal end of a handle with the support surface.

Figure 11:
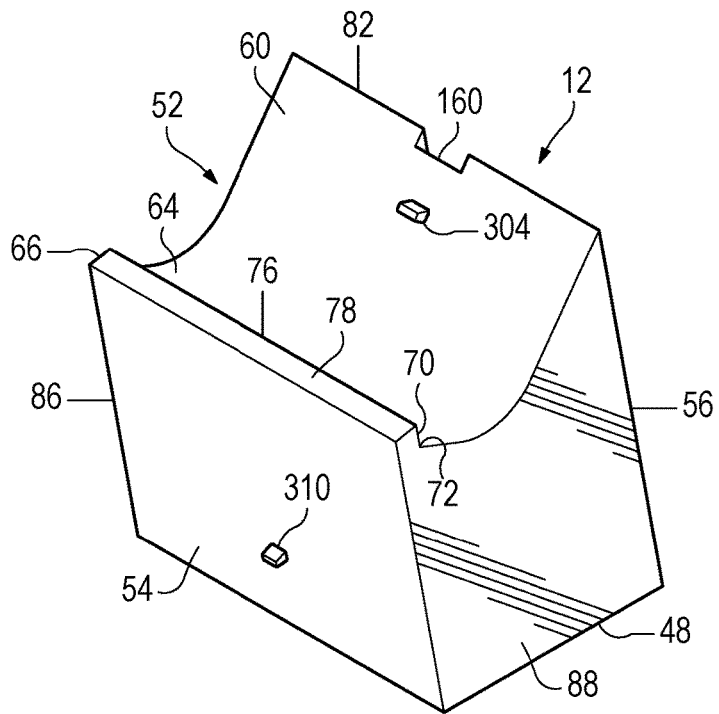
FIG. 11 shows a perspective view of a dual-orientation stand with registration features according to examples of the present disclosure.

In some examples, the dual-orientation stand 10 may comprise one or more registration features protruding from the concave portion 52 and configured to be received in one or more corresponding indentations in the game controller 16 when the controller is held in the first device orientation 14. With reference to FIGS. 5 and 11, in one example a single registration feature in the form of a protrusion 304 may be located on the upper portion 60 of the concave portion 52. The protrusion 304 may fit into a mating indentation in the rear surface 100 of the game controller 16 to secure the controller in the first device orientation 14. In other examples the protrusion 304 may be positioned at other locations within the concave portion 52.

In some examples a second registration feature may be added in addition to the protrusion 304. As shown in FIGS. 6 and 11, a second protrusion 310 may be located on the second planar surface 54 and configured to be received in the same mating indentation in the rear surface 100 of the game controller 16 to secure the controller in the second device orientation 214. In other examples the second protrusion 310 may be positioned at other locations on the second planar surface 54.

In some examples, protrusions 304 and 310 also may function as electrical and/or data contacts to provide electrical power to charge the controller and/or data to update firmware or provide other functionality. In some examples an additional contact, such as a ground, may be located with each of the protrusions/contacts 304 and 310. Additional examples of dual-orientation stands comprising charging and/or data components are provided below.

Figure 12:
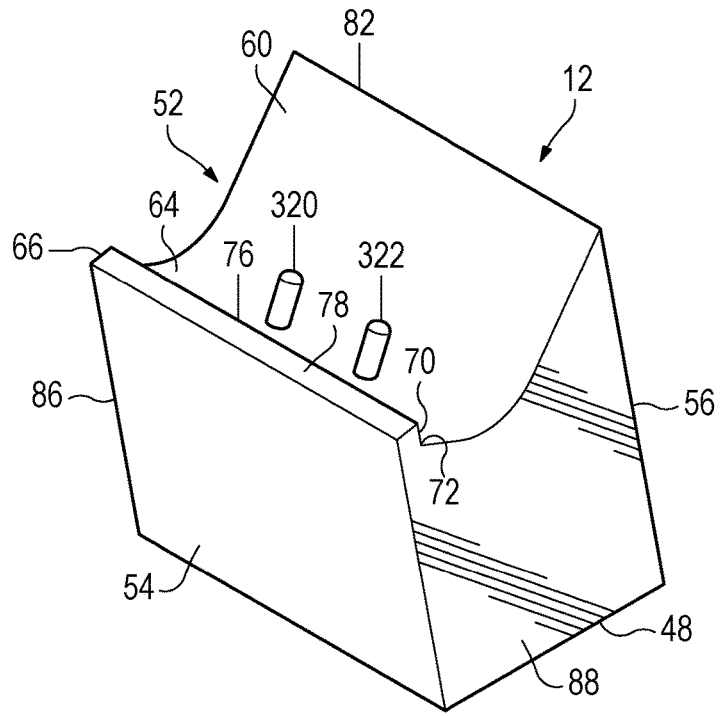
FIG. 12 shows a perspective view of a dual-orientation stand with registration features according to other examples of the present disclosure.

With reference to FIG. 12, in this example two pins 320 and 322 are located in the front portion 64 of the concave portion 52. The two protruding pins 320, 322 are configured to be received in corresponding apertures in the game controller 16 when the controller is held in the first device orientation 14.

Figure 13:
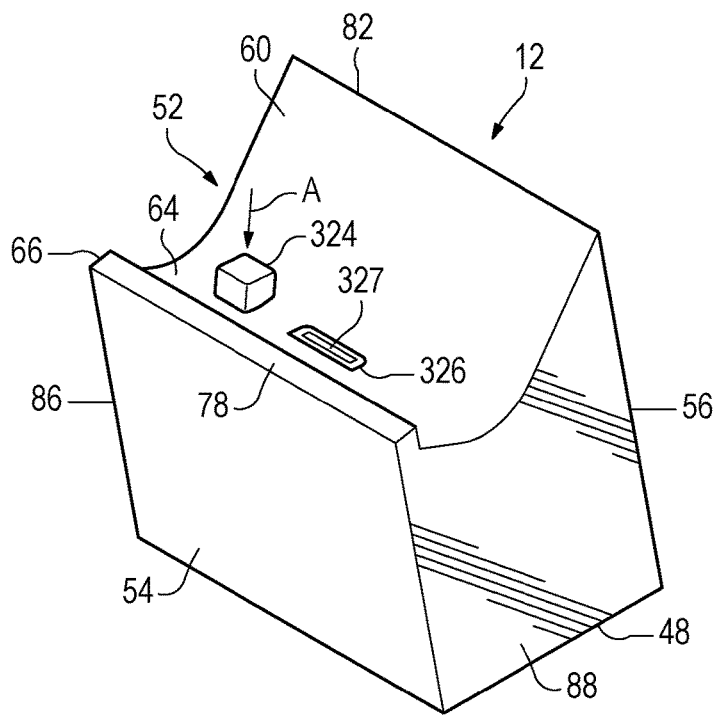
FIG. 13 shows a perspective view of a dual-orientation stand with a trigger button and a moveable connector according to examples of the present disclosure.
Figure 14:
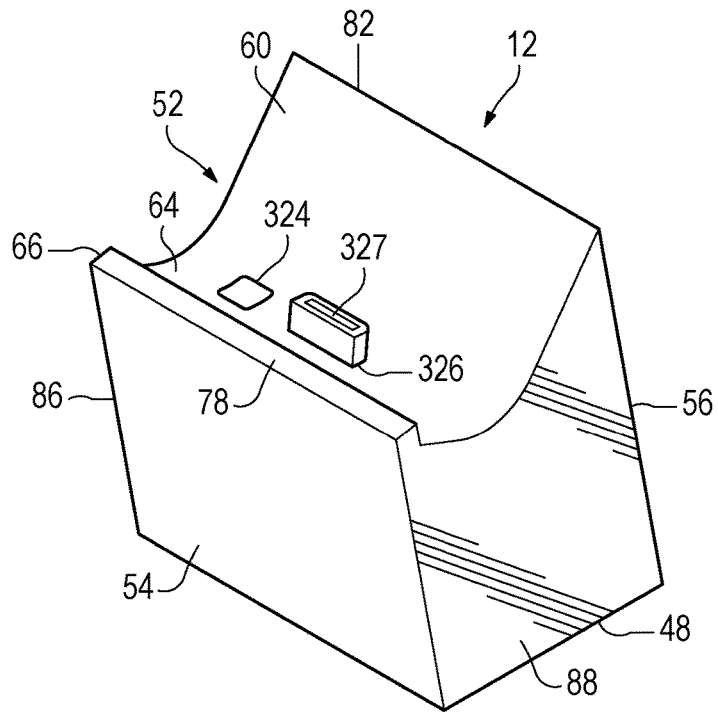
FIG. 14 shows a perspective view of the dual-orientation stand of FIG. 13 showing the trigger button depressed and the connector extended.

With reference now to FIGS. 13 and 14, in some examples the dual orientation stand 10 may comprise a trigger button 324 and a moveable connector 327 configured to mate with the port 92 on the central bottom portion 90 of the game controller 16. With reference to FIG. 13, in one example the connector 327 may be normally recessed within an aperture 326 located in the concave portion 52. When the game controller 16 is placed in the concave portion 52, the central bottom portion 90 of the controller depresses the trigger button 324 in the direction of action arrow A. Correspondingly, a linkage (not shown) connecting the trigger button 324 to the connector 327 raises the connector from within the aperture 326 to protrude above the concave portion 52 (as shown in FIG. 14). The game controller 16 may be oriented to allow the connector 327 to be inserted into the port 92. In some examples, the connector 327 may provide electrical power to charge the controller and/or data to update firmware or provide other functionality.

As noted above, in some examples the dual-orientation stand may comprise one or more charging components configured to be electrically coupled with a device charging component of the game controller 16 when the controller is held in the first device orientation 14. In some examples, a stand charging component may be configured to be electrically coupled with a device charging component of the game controller 16 when the controller is both (1) held in the first device orientation 14 and (2) supported in the second device orientation 214.

Figure 16:
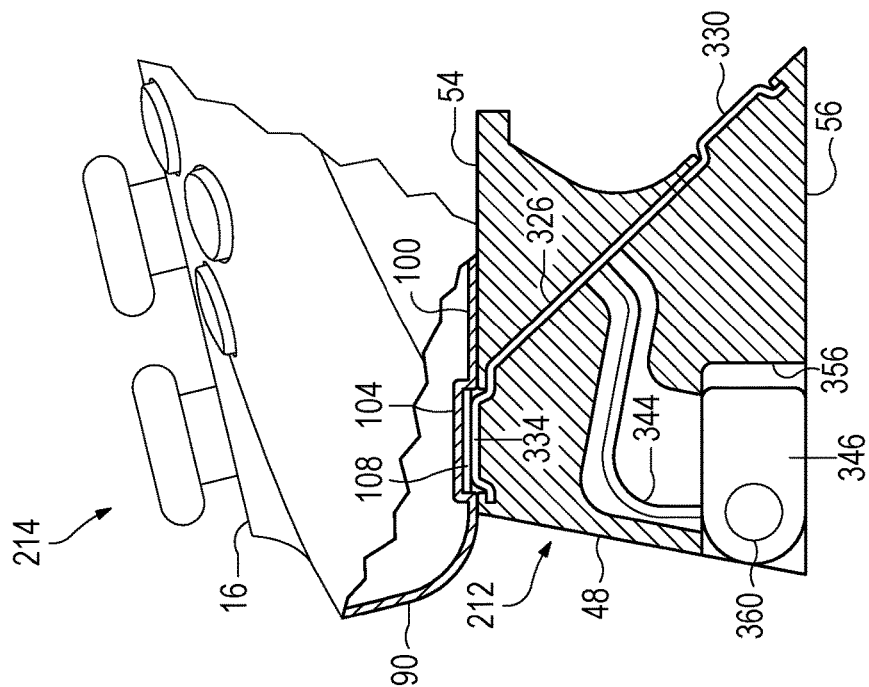
FIG. 16 shows a partial cross-section view of the dual-orientation stand of FIG. 15 in a second stand orientation.
Figure 15:
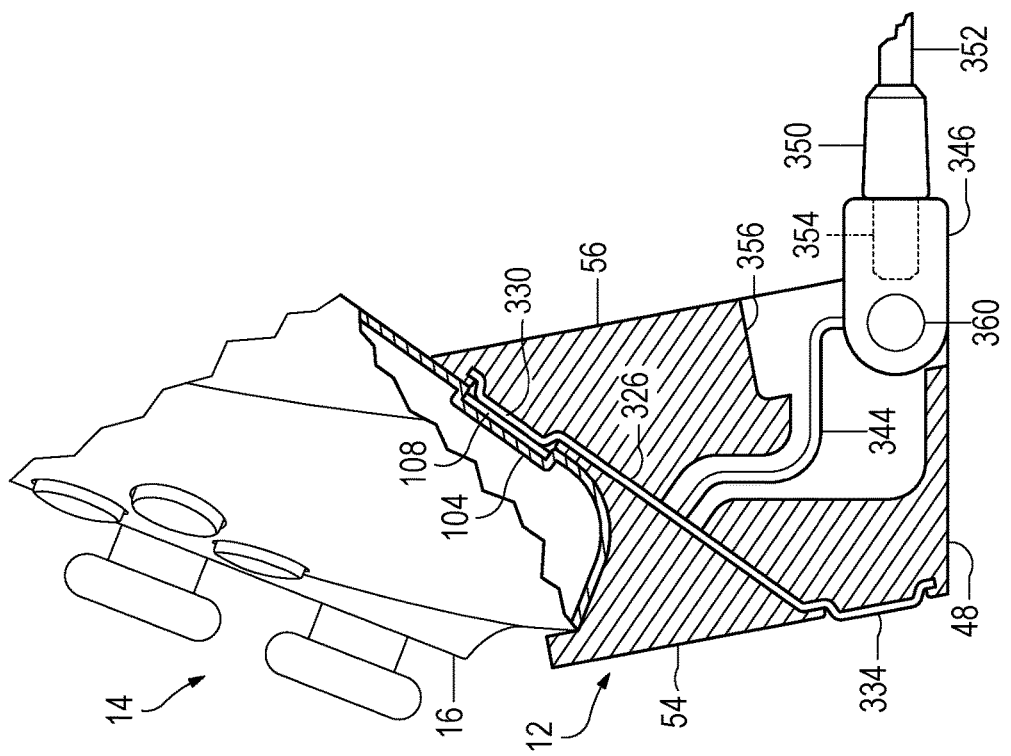
FIG. 15 shows a partial cross-section view of a dual-orientation stand with a stand charging component according to examples of the present disclosure.

With reference to FIGS. 15 and 16, in one example the dual-orientation stand 10 may comprise a single charging component in the form of a conductive strip 326. The conductive strip 326 may include a first contact surface 330 that protrudes from the upper portion 60 of the concave portion 52, and a second contact surface 334 that protrudes from the second planar surface 54. A flexible cord 344 electrically couples the conductive strip 326 to a connector 346. The connector 346 may releasably receive a male portion 354 of a plug 350 and electrical cable 352 that may plug into a power source, such as a USB port or a wall dongle, and supply power to the conductive strip 326. In some examples the connector 346 may be rotatably coupled within a cavity 356 of the stand 10 via a pin 360. In this manner, the connector 346 may extend from the stand 10 in the first stand orientation 12, and may rotate to be received within the cavity 356 in the second stand orientation 212 (see FIG. 16 showing the plug 350 and male portion 354 disconnected from the connector 346).

In other examples, the plug 350 and electrical cable 352 may be fixedly coupled to the connector 346. In these examples and with reference to FIG. 11, the stand 10 may comprise a channel 160 in the third planar surface 56 that may extend from the peak 82 of the upper portion 60 of the concave portion 52 to the cavity 356. In this manner, when the stand is in the second stand orientation 212, the electrical cable 352 may be received within the channel 160 to enable the third planar surface 56 to rest on a support surface.

As shown in FIG. 15, with the stand 10 in the first stand orientation 12 and the game controller 16 seated in the concave portion 52 in the first device orientation 14, the first contact surface 330 of the conductive strip 326 contacts a corresponding device contact 108 located within a recess 104 in the rear surface 100 of the controller. In this manner, the stand 10 may provide power to the game controller to, for example, charge rechargeable batteries of the controller.

With reference to FIG. 16, when the stand is in the second stand orientation 212 and the game controller 16 supported by the second planar surface 54 in the second device orientation 214, the second contact surface 334 of the conductive strip 326 contacts the same corresponding device contact 108 of the controller. In this manner, the stand 10 also may provide power to the game controller when the controller is in the second device orientation 214 via the same device contact 108.

In some examples the strip 326 also may comprise one or more additional contacts, such as a ground, data and/or video contact. In these examples, the game controller 16 may comprise corresponding additional contacts that mate with the additional strip contacts.

In other examples, the dual-orientation stand 10 may comprise two or more separate stand charging components. With reference to FIGS. 17 and 18, in one example the dual-orientation stand may comprise a first stand charging component in the form of first contact surface 370, and a second stand charging component in the form of second contact surface 374. The first contact surface 370 is configured to be electrically coupled with the corresponding device contact 108 of the game controller 16 when the controller is held in the first device orientation 14. Similarly, the second contact surface 374 is configured to be electrically coupled with the corresponding device contact 108 of the game controller 16 when the controller is held in the second device orientation 214. For clarity the electrical couplings of the first contact surface 370 and second contact surface 374 to an external power source are not shown, and any suitable electric coupling and configuration may be utilized.

In other examples, the dual-orientation stand may comprise one or more stand charging components in the form of one or more inductive charging components. With reference to FIGS. 19 and 20, in one example the dual-orientation stand may comprise a single inductive charging component in the form of an inductive charging coil 404. The inductive charging coil 404 may include a first inductive portion 408 that is located adjacent to the upper portion 60 of the concave portion 52, and a second inductive portion 412 that is located adjacent to the second planar surface 54.

The first inductive portion 408 of inductive charging coil 404 is configured to be inductively coupled with a corresponding device inductive component 120 of the game controller 16 when the controller is held in the first device orientation 14. Similarly, the second inductive portion 412 is configured to be inductively coupled with the corresponding device inductive component 120 when the controller is held in the second device orientation 214. For clarity the electrical couplings of the inductive charging coil 404 to an external power source and corresponding control circuitry are not shown, and any suitable electric coupling and configuration may be utilized.

In other examples, the dual-orientation stand may comprise two or more separate inductive charging components. With reference to FIGS. 21 and 22, in one example the dual-orientation stand may comprise a first inductive charging component in the form of first inductive charging coil 430, and a second inductive charging component in the form of second inductive charging coil 434. The first inductive charging coil 430 is configured to be inductively coupled with the corresponding device inductive component 120 of the game controller 16 when the controller is held in the first device orientation 14. Similarly, the second inductive charging coil 434 is configured to be inductively coupled with the corresponding device inductive component 120 when the controller is held in the second device orientation 214.

For clarity the electrical couplings of the first inductive charging coil 430 and second inductive charging coil 434 to an external power source and corresponding control circuitry are not shown, and any suitable electric coupling and configuration may be utilized.

With reference to FIGS. 23 and 24, in one example the dual-orientation stand may comprise an inductive charging component 502 that is coupled to a pivoting support 504 located between the second planar surface 54 and the third planar surface 56. The inductive charging component 502 may comprise a right inductive charging coil 508 and a left inductive charging coil 512. With reference to FIG. 23, the pivoting support is configured to position the inductive charging component 502 at a first angle X to the first planar surface 48 when the stand is in the first stand orientation 12.

In this orientation, a counterweight 516 urges the inductive charging component 502 to rotate in a clockwise direction, and a fixed stop 524 resists such rotation and positions the inductive charging component 502 at the first angle X to the first planar surface 48. In some examples, the first angle X may be between approximately 45 degrees and approximately 55 degrees, and may be approximately 50 degrees. In this position, the right charging coil 508 is positioned substantially parallel to a device inductive component 130 in the game controller 16 to facilitate inductive charging of the game controller 16 via the device inductive component.

With reference to FIG. 24, when the stand is placed in the second stand orientation 212, the pivoting support positions the inductive charging component 502 at a second angle Y to the first planar surface 48. In some examples, the second angle Y may be between approximately 96 degrees and approximately 106 degrees, and may be approximately 101 degrees. In this position, the left charging coil 512 is positioned substantially parallel to the device inductive component 130 to facilitate inductive charging of the game controller 16 via the device inductive component.

Figure 25:
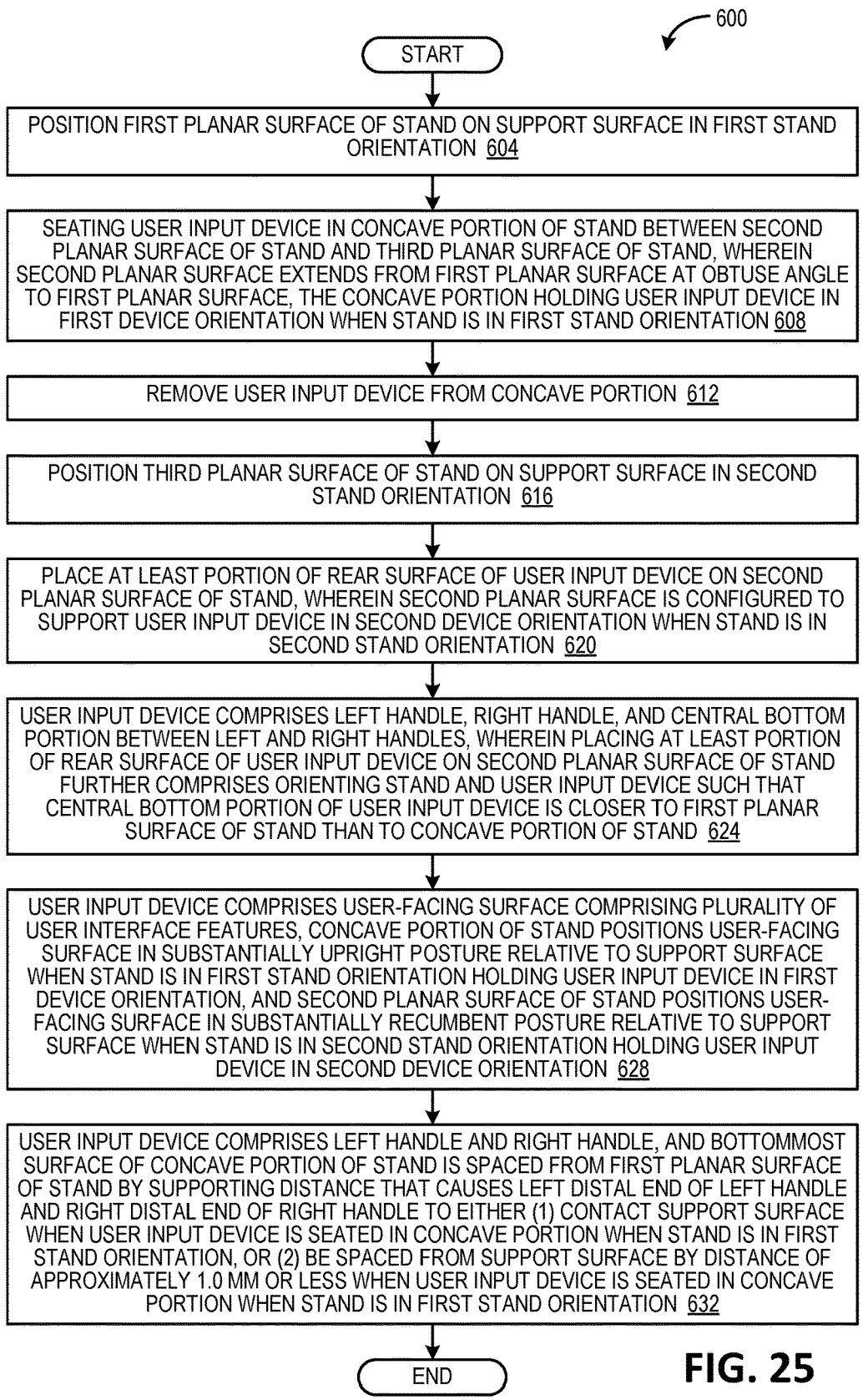
FIG. 25 is a flow chart of a method for displaying a user input device in two device orientations on a stand according to examples of the present disclosure.

FIG. 25 illustrates a flow chart of a method 600 for displaying a user input device in two device orientations on a stand according to an example of the present disclosure. The following description of method 600 is provided with reference to the components and use case scenarios described above and shown in FIGS. 1-24. It will be appreciated that method 600 also may be performed in other contexts using other suitable components.

With reference to FIG. 25, at 604 the method 600 may include positioning a first planar surface of the stand on a support surface in a first stand orientation. At 608 the method 600 may include seating the user input device in a concave portion of the stand between a second planar surface of the stand and a third planar surface of the stand, wherein the second planar surface extends from the first planar surface at an obtuse angle to the first planar surface, the concave portion holding the user input device in a first device orientation when the stand is in the first stand orientation. At 612 the method 600 may include removing the user input device from the concave portion. At 616 the method 600 may include positioning the third planar surface of the stand on the support surface in a second stand orientation.

At 620 the method may include placing at least a portion of a rear surface of the user input device on the second planar surface of the stand, wherein the second planar surface is configured to support the user input device in a second device orientation when the stand is in the second stand orientation. At 624 the method 600 may include, wherein the user input device comprises a left handle, a right handle, and a central bottom portion between the left handle and the right handle, and wherein placing at least the portion of the rear surface of the user input device on the second planar surface of the stand further comprises orienting the stand and the user input device such that the central bottom portion of the user input device is closer to the first planar surface of the stand than to the concave portion of the stand.

At 628 the method 600 may include, wherein the user input device comprises a user-facing surface comprising a plurality of user interface features, the concave portion of the stand positions the user-facing surface in a substantially upright posture relative to the support surface when the stand is in the first stand orientation holding the user input device in the first device orientation, and the second planar surface of the stand positions the user-facing surface in a substantially recumbent posture relative to the support surface when the stand is in the second stand orientation holding the user input device in the second device orientation.

At 632 the method 600 may include, wherein the user input device comprises a left handle and a right handle, and a bottommost surface of the concave portion of the stand is spaced from the first planar surface of the stand by a supporting distance that causes a left distal end of the left handle and a right distal end of the right handle to either (1) contact the support surface when the user input device is seated in the concave portion when the stand is in the first stand orientation, or (2) be spaced from the support surface by a distance of approximately 1.0 mm or less when the user input device is seated in the concave portion when the stand is in the first stand orientation.

It will be appreciated that method 600 is provided by way of example and is not meant to be limiting. Therefore, it is to be understood that method 600 may include additional and/or alternative steps relative to those illustrated in FIG. 25. Further, it is to be understood that method 600 may be performed in any suitable order. Further still, it is to be understood that one or more steps may be omitted from method 600 without departing from the scope of this disclosure.

The following paragraphs provide additional support for the claims of the subject application. One aspect provides a dual-orientation stand for a user input device, comprising: a first planar surface configured to rest on a support surface in a first stand orientation; a second planar surface extending from the first planar surface at an obtuse angle to the first planar surface; a third planar surface spaced from the second planar surface and extending from the first planar surface; and a concave portion between the second planar surface and the third planar surface configured to hold the user input device in a first device orientation when the dual-orientation stand is in the first stand orientation, wherein the second planar surface is configured to support the user input device in a second device orientation when the dual-orientation stand is in a second stand orientation in which the third planar surface rests on the support surface. The stand may additionally or optionally include, wherein the third planar surface extends from the first planar surface at an acute angle to the first planar surface. The stand may additionally or optionally include, wherein the second planar surface and the third planar surface are parallel. The stand may additionally or optionally include, wherein the obtuse angle to the first planar surface at which the second planar surface extends from the first planar surface is approximately 79.4 degrees. The stand may additionally or optionally include a left side planar surface extending between the second planar surface and the third planar surface, and a right side planar surface opposite to the left side planar surface and extending between the second planar surface and the third planar surface. The stand may additionally or optionally include, wherein the left side planar surface and the right sight planar surface are parallel. The stand may additionally or optionally include, wherein the user input device comprises a left handle and a right handle, and a bottommost surface of the concave portion of the stand is spaced from the first planar surface of the stand by a first supporting distance that causes a left distal end of the left handle and a right distal end of the right handle to either (1) contact the support surface when the user input device is held in the concave portion when the stand is in the first stand orientation, or (2) be spaced from the support surface by a distance of approximately 1.0 mm or less when the user input device is held in the concave portion when the stand is in the first stand orientation. The stand may additionally or optionally include, wherein the user input device comprises a left handle and a right handle, and the second planar surface of the stand is spaced from the third planar surface of the stand by a second supporting distance that causes a left anterior distal end of the left handle and a right anterior distal end of the right handle to either (1) contact the support surface when the user input device is supported by the second planar surface when the stand is in the second stand orientation, or (2) be spaced from the support surface by a distance of approximately 1.0 mm or less when the user input device is supported by the second planar surface when the stand is in the second stand orientation. The stand may additionally or optionally include, wherein the user input device comprises a user-facing surface comprising a plurality of user interface features, the concave portion of the stand positions the user-facing surface in a substantially upright posture relative to the support surface when the stand is in the first stand orientation holding the user input device in the first device orientation, and the second planar surface of the stand positions the user-facing surface in a substantially recumbent posture relative to the support surface when the stand is in the second stand orientation holding the user input device in the second device orientation. The stand may additionally or optionally include a stand charging component configured to be electrically coupled with a device charging component of the user input device when the user input device is held in the first device orientation. The stand may additionally or optionally include, wherein the stand charging component is further configured to be electrically coupled with the device charging component of the user input device when the user input device is supported in the second device orientation. The stand may additionally or optionally include, wherein the stand charging component comprises an inductive charging component, the stand further comprising a pivoting support between the second planar surface and the third planar surface, wherein the inductive charging component is coupled to the pivoting support, and the pivoting support is configured to position the inductive charging component at a first angle to the first planar surface when the stand is in the first stand orientation, and to position the inductive charging component at a second angle to the first planar surface when the stand is in the second stand orientation. The stand may additionally or optionally include, a first stand charging component configured to be electrically coupled with a first device charging component of the user input device when the user input device is held in the first device orientation; and a second stand charging component configured to be electrically coupled with a second device charging component of the user input device when the user input device is supported in the second device orientation. The stand may additionally or optionally include, a registration feature protruding from the concave portion and configured to be received in a corresponding indentation of the user input device when the user input device is held in the first device orientation. The stand may additionally or optionally include, wherein the registration feature is a first orientation registration feature, the stand further comprising a second orientation registration feature protruding from the second planar surface and configured to be received in the corresponding indentation of the user input device when the user input device is supported in the second device orientation.

Another aspect provides method for displaying a user input device in two device orientations on a stand, the method comprising: positioning a first planar surface of the stand on a support surface in a first stand orientation; seating the user input device in a concave portion of the stand between a second planar surface of the stand and a third planar surface of the stand, wherein the second planar surface extends from the first planar surface at an obtuse angle to the first planar surface, the concave portion holding the user input device in a first device orientation when the stand is in the first stand orientation; removing the user input device from the concave portion; positioning the third planar surface of the stand on the support surface in a second stand orientation; and placing at least a portion of a rear surface of the user input device on the second planar surface of the stand, wherein the second planar surface is configured to support the user input device in a second device orientation when the stand is in the second stand orientation. The method may additionally or optionally include, wherein the user input device comprises a left handle, a right handle, and a central bottom portion between the left handle and the right handle, and wherein placing at least the portion of the rear surface of the user input device on the second planar surface of the stand further comprises orienting the stand and the user input device such that the central bottom portion of the user input device is closer to the first planar surface of the stand than to the concave portion of the stand. The method may additionally or optionally include, wherein the user input device comprises a user-facing surface comprising a plurality of user interface features, the concave portion of the stand positions the user-facing surface in a substantially upright posture relative to the support surface when the stand is in the first stand orientation holding the user input device in the first device orientation, and the second planar surface of the stand positions the user-facing surface in a substantially recumbent posture relative to the support surface when the stand is in the second stand orientation holding the user input device in the second device orientation. The method may additionally or optionally include, wherein the user input device comprises a left handle and a right handle, and a bottommost surface of the concave portion of the stand is spaced from the first planar surface of the stand by a supporting distance that causes a left distal end of the left handle and a right distal end of the right handle to either (1) contact the support surface when the user input device is seated in the concave portion when the stand is in the first stand orientation, or (2) be spaced from the support surface by a distance of approximately 1.0 mm or less when the user input device is seated in the concave portion when the stand is in the first stand orientation.

Another aspect provides a dual-orientation stand for a user input device, comprising: a first planar surface configured to rest on a support surface in a first stand orientation; a second planar surface extending from the first planar surface at an obtuse angle to the first planar surface; a third planar surface spaced from and parallel to the second planar surface and extending from the first planar surface; and a concave portion between the second planar surface and the third planar surface configured to hold the user input device in a first device orientation when the dual-orientation stand is in the first stand orientation, wherein the second planar surface is configured to support the user input device in a second device orientation when the dual-orientation stand is in a second stand orientation in which the third planar surface rests on the support surface, wherein the user input device comprises a left handle and a right handle, and a bottommost surface of the concave portion of the stand is spaced from the first planar surface of the stand by a supporting distance that causes a left distal end of the left handle and a right distal end of the right handle to contact the support surface when the user input device is held in the concave portion when the stand is in the first stand orientation.

It will be understood that the configurations and/or approaches described herein are exemplary in nature, and that these specific embodiments or examples are not to be considered in a limiting sense, because numerous variations are possible. The specific routines or methods described herein may represent one or more of any number of operational strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various features disclosed herein, as well as any and all equivalents thereof.

The invention claimed is:

1. A dual-orientation stand for a user input device, comprising:
   a first planar surface configured to rest on a support surface in a first stand orientation;
   a second planar surface extending from the first planar surface at an obtuse angle to the first planar surface;
   a third planar surface spaced from the second planar surface and extending from the first planar surface; and
   a concave portion between the second planar surface and the third planar surface configured to hold the user input device in a first device orientation when the dual-orientation stand is in the first stand orientation, wherein the second planar surface is configured to support the user input device in a second device orientation when the dual-orientation stand is in a second stand orientation in which the third planar surface rests on the support surface.

2. The stand of claim 1, wherein the third planar surface extends from the first planar surface at an acute angle to the first planar surface.

3. The stand of claim 1, wherein the second planar surface and the third planar surface are parallel.

4. The stand of claim 1, wherein the obtuse angle to the first planar surface at which the second planar surface extends from the first planar surface is approximately 79.4 degrees.

5. The stand of claim 1, further comprising a left side planar surface extending between the second planar surface and the third planar surface, and a right side planar surface opposite to the left side planar surface and extending between the second planar surface and the third planar surface.

6. The stand of claim 5, wherein the left side planar surface and the right side planar surface are parallel.

7. The stand of claim 1, wherein the user input device comprises a left handle and a right handle, and a bottommost surface of the concave portion of the stand is spaced from the first planar surface of the stand by a first supporting distance that causes a left distal end of the left handle and a right distal end of the right handle to either (1) contact the support surface when the user input device is held in the concave portion when the stand is in the first stand orientation, or (2) be spaced from the support surface by a distance of 1.0 mm or less when the user input device is held in the concave portion when the stand is in the first stand orientation.

8. The stand of claim 1, wherein the user input device comprises a left handle and a right handle, and the second planar surface of the stand is spaced from the third planar surface of the stand by a second supporting distance that causes a left anterior distal end of the left handle and a right anterior distal end of the right handle to either (1) contact the support surface when the user input device is supported by the second planar surface when the stand is in the second stand orientation, or (2) be spaced from the support surface by a distance of 1.0 mm or less when the user input device is supported by the second planar surface when the stand is in the second stand orientation.

9. The stand of claim 1, wherein the user input device comprises a user-facing surface comprising a plurality of user interface features, the concave portion of the stand positions the user-facing surface in a substantially upright posture relative to the support surface when the stand is in the first stand orientation holding the user input device in the first device orientation, and the second planar surface of the stand positions the user-facing surface in a substantially recumbent posture relative to the support surface when the stand is in the second stand orientation holding the user input device in the second device orientation.

10. The stand of claim 1, further comprising a stand charging component configured to be electrically coupled with a device charging component of the user input device when the user input device is held in the first device orientation.

11. The stand of claim 10, wherein the stand charging component is further configured to be electrically coupled with the device charging component of the user input device when the user input device is supported in the second device orientation.

12. The stand of claim 11, wherein the stand charging component comprises an inductive charging component, the stand further comprising a pivoting support between the second planar surface and the third planar surface, wherein the inductive charging component is coupled to the pivoting support, and the pivoting support is configured to position the inductive charging component at a first angle to the first planar surface when the stand is in the first stand orientation, and to position the inductive charging component at a second angle to the first planar surface when the stand is in the second stand orientation.

13. The stand of claim 1, further comprising:
a first stand charging component configured to be electrically coupled with a first device charging component of the user input device when the user input device is held in the first device orientation; and
a second stand charging component configured to be electrically coupled with a second device charging component of the user input device when the user input device is supported in the second device orientation.

14. The stand of claim 1, further comprising a registration feature protruding from the concave portion and configured to be received in a corresponding indentation of the user input device when the user input device is held in the first device orientation.

15. The stand of claim 14, wherein the registration feature is a first orientation registration feature, the stand further comprising a second orientation registration feature protruding from the second planar surface and configured to be received in the corresponding indentation of the user input device when the user input device is supported in the second device orientation.

16. A method for displaying a user input device in two device orientations on a stand, the method comprising:
positioning a first planar surface of the stand on a support surface in a first stand orientation;
seating the user input device in a concave portion of the stand between a second planar surface of the stand and a third planar surface of the stand, wherein the second planar surface extends from the first planar surface at an obtuse angle to the first planar surface, the concave portion holding the user input device in a first device orientation when the stand is in the first stand orientation;
removing the user input device from the concave portion;
positioning the third planar surface of the stand on the support surface in a second stand orientation; and
placing at least a portion of a rear surface of the user input device on the second planar surface of the stand, wherein the second planar surface is configured to support the user input device in a second device orientation when the stand is in the second stand orientation.

17. The method of claim 16, wherein the user input device comprises a left handle, a right handle, and a central bottom portion between the left handle and the right handle, and wherein placing at least the portion of the rear surface of the user input device on the second planar surface of the stand further comprises orienting the stand and the user input device such that the central bottom portion of the user input device is closer to the first planar surface of the stand than to the concave portion of the stand.

18. The method of claim 16, wherein the user input device comprises a user-facing surface comprising a plurality of user interface features, the method further comprising positioning the user-facing surface in a substantially upright posture relative to the support surface when the stand is in the first stand orientation holding the user input device in the first device orientation, and positioning the user-facing surface in a substantially recumbent posture relative to the support surface when the stand is in the second stand orientation holding the user input device in the second device orientation.

19. The method of claim 16, wherein the user input device comprises a left handle and a right handle, the method further comprising seating the user input device in the concave portion to cause a left distal end of the left handle and a right distal end of the right handle to either (1) contact the support surface when the stand is in the first stand orientation, or (2) be spaced from the support surface by a distance of 1.0 mm or less when the stand is in the first stand orientation.

20. A dual-orientation stand for a user input device, comprising:
a first planar surface configured to rest on a support surface in a first stand orientation;
a second planar surface extending from the first planar surface at an obtuse angle to the first planar surface;
a third planar surface spaced from and parallel to the second planar surface and extending from the first planar surface; and
a concave portion between the second planar surface and the third planar surface configured to hold the user input device in a first device orientation when the dual-orientation stand is in the first stand orientation, wherein the second planar surface is configured to support the user input device in a second device orientation when the dual-orientation stand is in a second stand orientation in which the third planar surface rests on the support surface, wherein the user input device comprises a left handle and a right handle, and a bottommost surface of the concave portion of the stand is spaced from the first planar surface of the stand by a supporting distance that causes a left distal end of the left handle and a right distal end of the right handle to contact the support surface when the user input device is held in the concave portion when the stand is in the first stand orientation.

\* \* \* \* \*